(12) United States Patent
Kitai

(10) Patent No.: US 10,863,099 B2
(45) Date of Patent: Dec. 8, 2020

(54) ELECTRONIC APPARATUS AND CONTROL METHOD FOR NOTIFYING OF A CHANGE IN PROCESSING IF AN OPERATION AMOUNT CHANGES FROM ONE RANGE TO ANOTHER RANGE

(71) Applicant: CANON KABUSHIKI KAISHA, Tokyo (JP)

(72) Inventor: Shimpei Kitai, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 16/129,233

(22) Filed: Sep. 12, 2018

(65) Prior Publication Data

US 2019/0089905 A1 Mar. 21, 2019

(30) Foreign Application Priority Data

Sep. 19, 2017 (JP) ................. 2017-178962

(51) Int. Cl.
*H04N 5/232* (2006.01)
*H04N 5/262* (2006.01)
*H04N 5/235* (2006.01)

(52) U.S. Cl.
CPC ..... *H04N 5/23296* (2013.01); *H04N 5/23229* (2013.01); *H04N 5/23245* (2013.01);
(Continued)

(58) Field of Classification Search
CPC ......... H04N 5/23293; H04N 5/232933; H04N 5/232939; H04N 5/232941;
(Continued)

(56) References Cited

U.S. PATENT DOCUMENTS

2004/0189848 A1* 9/2004 Idemura ............... H04N 5/2251
348/333.01
2009/0310016 A1* 12/2009 Fukuda ................ H04N 5/4401
348/441

(Continued)

FOREIGN PATENT DOCUMENTS

CN 104951214 A 9/2015
JP 3-13072 A 1/1991
(Continued)

*Primary Examiner* — Albert H Cutler
(74) *Attorney, Agent, or Firm* — Canon U.S.A., Inc. I.P. Division

(57) ABSTRACT

An electronic apparatus includes a processing unit configured to execute processing using a first processing amount for a predetermined item, in a case where the operation amount is included in a range of a first operation amount of the operation member, and to execute processing using a second processing amount for the predetermined item, in a case where the operation amount is included in a range of a second operation amount next to the range of the first operation amount, and a control unit configured to perform control for providing a notification about a function to be executed by the processing unit or the operation amount, in a case where a predetermined condition that the operation amount is continuously included in the range of the first operation amount for a predetermined time or more is satisfied.

19 Claims, 7 Drawing Sheets

(52) U.S. Cl.
CPC . *H04N 5/232935* (2018.08); *H04N 5/232939* (2018.08); *H04N 5/2628* (2013.01)

(58) Field of Classification Search
CPC ......... H04N 5/23296; H04N 5/232935; H04N 5/23245; H04N 5/23229; H04N 5/2628; H04N 5/232; H04N 5/23212; H04N 5/235; G03B 5/00
USPC .............. 348/240.99, 240.3, 333.01, 333.02, 348/333.04, 346
See application file for complete search history.

(56) References Cited

U.S. PATENT DOCUMENTS

| | | | | |
|---|---|---|---|---|
| 2010/0295970 | A1* | 11/2010 | Suzuki | H04N 5/232 348/240.3 |
| 2012/0257499 | A1* | 10/2012 | Chatterjee | H04W 28/0284 370/232 |
| 2012/0280087 | A1* | 11/2012 | Coffman | G05D 1/0016 244/175 |
| 2013/0265467 | A1 | 10/2013 | Matsuzawa | |
| 2016/0044236 | A1* | 2/2016 | Matsuzawa | H04N 5/23296 348/240.2 |
| 2019/0230290 | A1* | 7/2019 | Yasuda | G02B 7/08 |

FOREIGN PATENT DOCUMENTS

| | | | |
|---|---|---|---|
| JP | 1184212 | * | 3/1999 |
| JP | 2000-284162 A | | 10/2000 |

\* cited by examiner

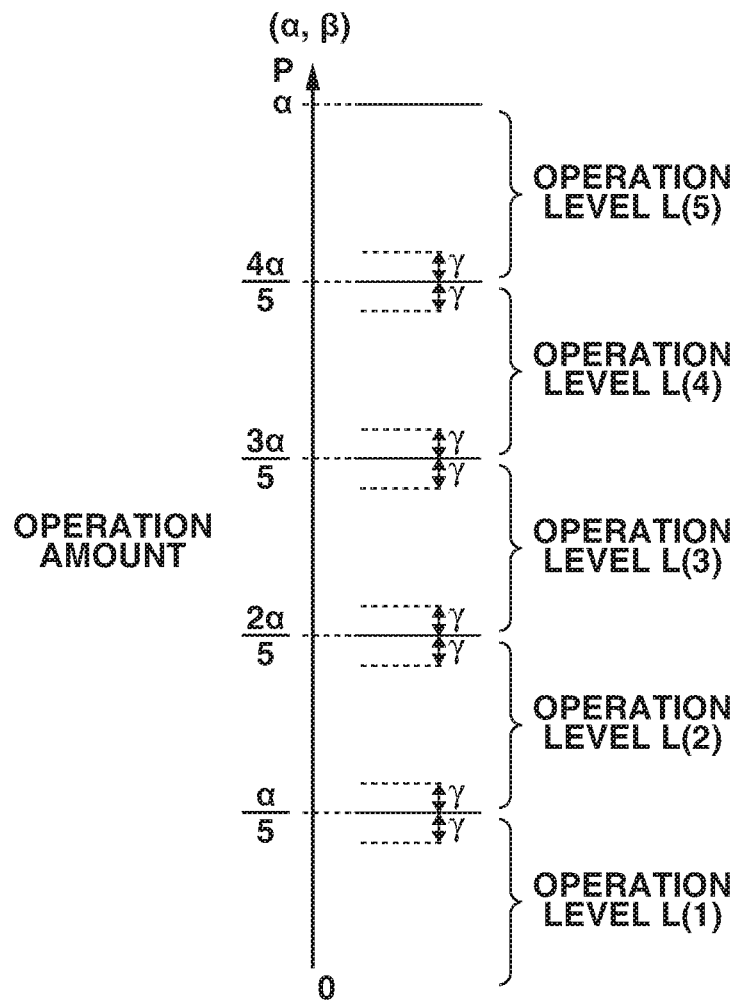

ELECTRONIC APPARATUS AND CONTROL METHOD FOR NOTIFYING OF A CHANGE IN PROCESSING IF AN OPERATION AMOUNT CHANGES FROM ONE RANGE TO ANOTHER RANGE

BACKGROUND OF THE INVENTION

Field of the Invention

The present disclosure generally relates to an electronic apparatus capable of executing processing according to an operation amount of an operation member and a control method for the electronic apparatus.

Description of the Related Art

There is a method for setting a zoom speed from among a plurality of zoom speeds. Japanese Patent Application Laid-Open No. 3-13072 discusses changing a zoom speed among highest, medium, and lowest speeds, by turning a switch. Meanwhile, there is a technology for executing processing according to an operation amount of an operation member. For this operation member, the operation amount is adjustable in a plurality of stages. Examples of such an operation member include a lever, a joystick, and a rotary member. Japanese Patent Application Laid-Open No. 2000-284162 discusses a related technique in which a zoom speed can be changed based on an operation amount of a seesaw switch that is freely changeable between two positions relative to a neutral position. In this technique, the zoom speed becomes higher as a press amount increases.

In Japanese Patent Application Laid-Open No. 3-13072, a setting value is changed to any of the highest, medium and lowest speeds by turning on/off the switch. In a case where the setting value increases in stages, it may be difficult to intuitively understand the relationship between the level of the setting value and the operation. In a case where the setting value is changed based on an operation amount as with the seesaw switch of Japanese Patent Application Laid-Open No. 2000-284162, even if a zoom speed being set is displayed, it may be difficult to understand what level of operation changes the zoom speed, for example, from the medium speed to the highest speed.

SUMMARY OF THE INVENTION

The present invention is directed to an electronic apparatus capable of improving operationality for a user, when processing according to an operation amount is performed.

According to one embodiment of the present disclosure, an electronic apparatus includes a memory and at least one processor and/or circuit which function as an acquisition unit configured to acquire an operation amount of an operation member, a processing unit configured to execute processing using a first processing amount for a predetermined item, in a case where the operation amount acquired by the acquisition unit is included in a range of a first operation amount of the operation member, and to execute processing using a second processing amount for the predetermined item, in a case where the operation amount acquired by the acquisition unit is included in a range of a second operation amount next to the range of the first operation amount, and a control unit configured to perform control for providing a notification about at least one of a function to be executed by the processing unit and the operation amount acquired by the acquisition unit, in a case where a predetermined condition, that the operation amount acquired by the acquisition unit is continuously included in the range of the first operation amount for a predetermined elapsed time or greater, is satisfied.

Further features of the present disclosure will become apparent from the following description of exemplary embodiments with reference to the attached drawings.

BRIEF DESCRIPTION OF THE DRAWINGS

FIGS. 6A to 6C each illustrate operation levels of a zoom lever according to the present exemplary embodiment.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1:
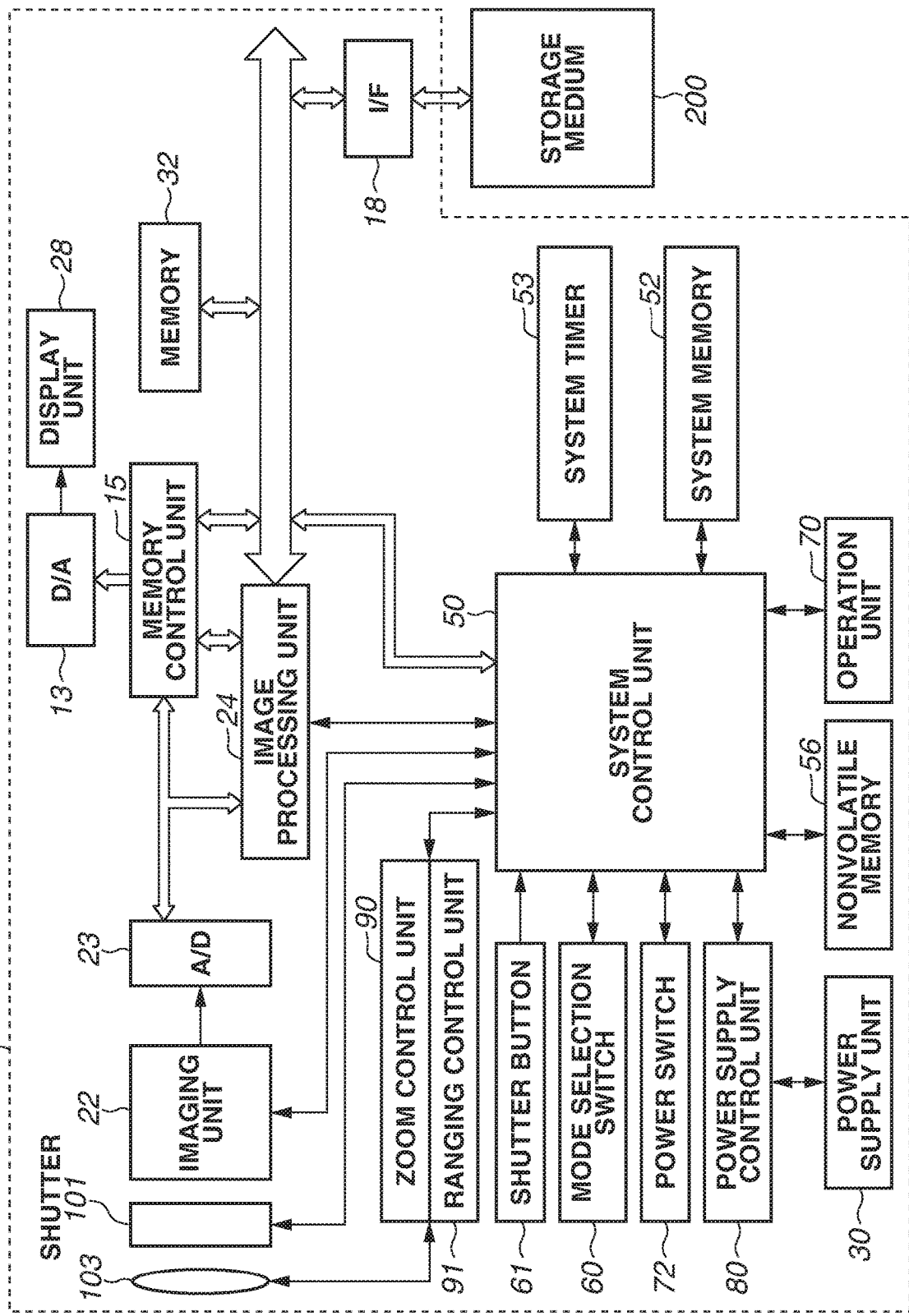
FIG. 1 is a block diagram illustrating a digital camera serving as an example of an apparatus to which an exemplary embodiment is applicable.

Operation of an exemplary embodiment will be described below with reference to the drawings. FIG. 1 is a block diagram illustrating a configuration example of a digital camera 100 according to the present exemplary embodiment.

In FIG. 1, a lens 103 is a lens group including a zoom lens and a focus lens. The zoom lens is provided to change a zoom ratio by changing a focal length and controlled by a zoom control unit 90. The focus lens is provided to perform focus adjustment and controlled by a ranging control unit 91. A shutter 101 has an aperture function. An imaging unit 22 is an imaging sensor configured of a charge-coupled device (CCD) or complementary metal oxide semiconductor (CMOS) sensor, which converts an optical image into an electrical signal. The imaging unit 22 can image an object. An analog-to-digital (A/D) converter 23 converts an analog signal into a digital signal. The A/D converter 23 is used to convert an analog signal output from the imaging unit 22 into a digital signal.

An image processing unit 24 performs predetermined pixel interpolation, resizing processing such as reduction, and color conversion processing, for data from the A/D converter 23 or data from a memory control unit 15. Further, the image processing unit 24 performs predetermined calculation processing, by using image data resulting from imaging. Based on an obtained calculation result, a system control unit 50 performs exposure control and ranging control. Through-the-lens (TTL) type auto-focus (AF) processing, auto-exposure (AE) processing, and pre-flash (EF) processing are thereby performed. The image processing unit 24 further performs predetermined calculation processing by using the image data resulting from imaging, and also performs TTL-type automatic white balance (AWB) processing, based on the obtained calculation result.

Output data from the A/D converter 23 is written in a memory 32 via the image processing unit 24 and the memory control unit 15, or directly via the memory control unit 15.

The memory 32 stores image data obtained by the imaging unit 22 and converted into digital data by the A/D converter 23. The memory 32 also stores image data to be displayed on a display unit 28. The memory 32 has a memory capacity large enough to store a predetermined number of still images as well as a moving image and sound of a predetermined time length. The memory 32 also serves as a memory (a video memory) for image display.

A digital-to-analog (D/A) converter 13 converts data for image display stored in the memory 32 into an analog signal, and supplies the analog signal to the display unit 28. The image data for display written in the memory 32 is thus displayed on the display unit 28 via the D/A converter 13.

The display unit 28 performs display according to the analog signal from the D/A converter 13, on a display device such as a liquid crystal display (LCD). The digital signals resulting from the conversion by the A/D converter 23 are accumulated in the memory 32, and then converted into analog signals by the D/A converter 13. These analog signals are then transferred to the display unit 28 one after another to be displayed. The display unit 28 thereby functions as an electronic viewfinder, and can display a live image. Further, in the present exemplary embodiment, the display unit 28 is, for example, a liquid crystal display, and brightness adjustment of liquid crystal corresponds to luminance setting of backlight. However, the display unit 28 is not limited to the liquid crystal display, and other type of display such as an organic electro luminescence (organic EL) display may be adopted. In a case where the organic EL display is adopted, luminance setting is performed for self-luminosity.

A nonvolatile memory 56 is an electrically erasable/recordable memory. For example, an electrically erasable programmable read only memory (EEPROM) is used. The nonvolatile memory 56 stores information such as a constant for the operation of the system control unit 50, and a program. The program mentioned here is a program for executing various flowcharts to be described below in the present exemplary embodiment.

The system control unit 50 controls the entire digital camera 100. The system control unit 50 implements each kind of processing to be described below of the present exemplary embodiment, by executing the program recorded in the nonvolatile memory 56 described above.

A system memory 52 is provided for the operation of the system control unit 50, and the program read out from the nonvolatile memory 56. For example, a random access memory (RAM) is used for the system memory 52. The system control unit 50 also performs display control by controlling components such as the memory 32, the D/A converter 13, and the display unit 28.

A system timer 53 is a clocking unit for measuring the time to be used for various kinds of control and the time of a built-in clock.

A mode selection switch 60, a shutter button 61, and an operation unit 70 are operation devices to be used for inputting various operation instructions into the system control unit 50. The operation unit 70 includes operation members that are appropriately assigned functions for each scene, and act as various function buttons, by selection and operation of various function icons displayed on the display unit 28. Examples of the function buttons include an end button, a return button, an image feeding button, a jump button, a narrowing-down button, and an attribute change button. For example, when a menu button is pressed, a menu screen for various kinds of setting is displayed on the display unit 28. A user can intuitively perform various kinds of setting, by using the menu screen displayed on the display unit 28, as well as a four-direction, i.e., up, down, left, and right, button, and a SET button.

One of the operation members of the operation unit 70 is a zoom lever 71 to be described below. The zoom lever 71 is of a seesaw type. The zoom lever 71 is configured such that a voltage-change amount is larger as an inclination is greater. The system control unit 50 can detect a voltage change when the zoom lever 71 is operated, and thereby acquire an operation amount of the zoom lever 71. In addition, according to the detected voltage change (operation amount), the system control unit 50 determines the speed of variable-speed zooming by referring to an operation level list to be described below, and causes the zoom control unit 90 to drive the zooming to change the position of the lens 103. In this way, changing a zoom speed (a processing amount) according to an operation amount of the zoom lever 71 is implemented. In the present exemplary embodiment, operation amounts for the zoom lever 71 are classified into five operation levels, and it is possible to set a zoom speed to be used when each of the operation levels is reached. The zoom speed may be changed in proportion to the operation amount of the zoom lever 71.

The mode selection switch 60 is used to change an operating mode of the system control unit 50 to any one of modes including a still image mode, a moving image mode, and a playback mode. The still image mode includes an automatic image-capturing mode, an automatic scene determination mode, a manual mode, and various scene modes each providing setting for image capturing for each image-capturing scene. The still image mode further includes a program AE mode, an aperture priority AE mode (hereinafter referred to as AV mode), a shutter-speed priority AE mode (hereinafter referred to as TV mode), a custom mode, and a manual mode (hereinafter referred to as M mode). Any of these modes included in the still image mode can be directly selected by the mode selection switch 60. Alternatively, after selection of the still image mode by the mode selection switch 60, any of these modes included in the still image mode may be selected using another operation member. Similarly, the moving image mode may include a plurality of modes.

Still-image capturing or moving-image capturing can be performed in response to the press of the shutter button 61. In the still image mode, an image captured in response to the press of the shutter button 61 is recorded into a storage medium 200. In the moving image mode, moving-image recording begins in response to the press of the shutter button 61 when image capturing (recording) is not underway. The moving-image recording stops when the shutter button 61 is pressed after the start of the image capturing. Here, the image capturing represents a series of image-capturing processes from reading out of a signal from the imaging unit 22 to writing of image data into the storage medium 200.

A power supply control unit 80 includes a battery detecting circuit, a DC-DC converter, and a switch circuit for selecting a block to be supplied with power. The power supply control unit 80 detects the presence or absence of an attached battery, the type of the battery, and a remaining battery level. The power supply control unit 80 controls the DC-DC converter based on a result of such detection and an instruction of the system control unit 50, and supplies each of the units including the storage medium 200 with a necessary voltage for a necessary period. A power switch 72 is provided to switch between power-on and power-off of the digital camera 100.

A power supply unit 30 includes a primary battery such as an alkaline cell or a lithium battery, or a secondary battery such a NiCd battery, a NiMH battery, or a Li battery, or an AC adapter. A storage medium interface (I/F) 18 is an interface with the storage medium 200 such as a memory card or a hard disk. The storage medium 200 is a medium such as a memory card for recording captured images, and includes a device such as a semiconductor memory or a magnetic disk.

Next, an appearance of the digital camera 100 in the present exemplary embodiment will be described with reference to FIGS. 2A to 2C.

Figure 2A:
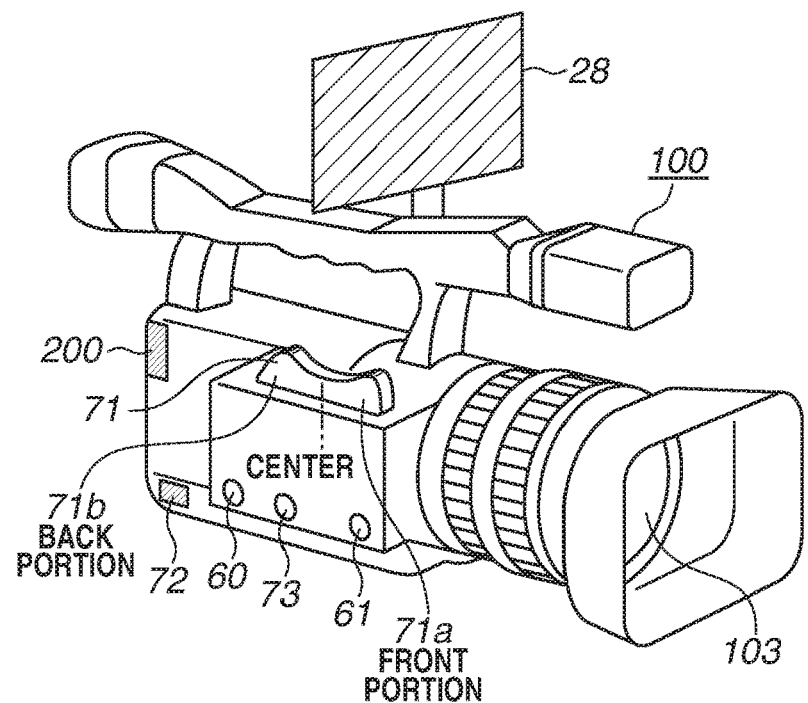
FIGS. 2A to 2C are external views illustrating the digital camera serving as the example of the apparatus to which the exemplary embodiment is applicable.

FIG. 2A is a diagram illustrating an external view of the entire digital camera 100. The power switch 72 is a push button for switching between power-on and power-off. The mode selection switch 60 is a switch for selecting an image-capturing mode. A menu button 73 is a button for displaying a menu screen. The shutter button 61 is a button for providing an image-capturing instruction. The zoom lever 71 is an operation member for changing the zoom speed. The zoom lever 71 is movable back and forth about a central position of the zoom lever 71. At the press of a front portion 71a of the zoom lever 71, the zoom lever 71 turns toward the lens 103 up to a predetermined angle such as 30 degrees or 40 degrees. At the press of a back portion 71b of the zoom lever 71, the zoom lever 71 turns in the direction opposite to the lens 103 up to a predetermined angle. The power switch 72, the mode selection switch 60, the menu button 73, and the shutter button 61 are operation members included in the operation unit 70.

The display unit 28 displays an image and various kinds of information. The shutter button 61 is an operation member for providing an image-capturing instruction. The mode selection switch 60 is an operation member for selecting any of various modes.

Figure 2B:
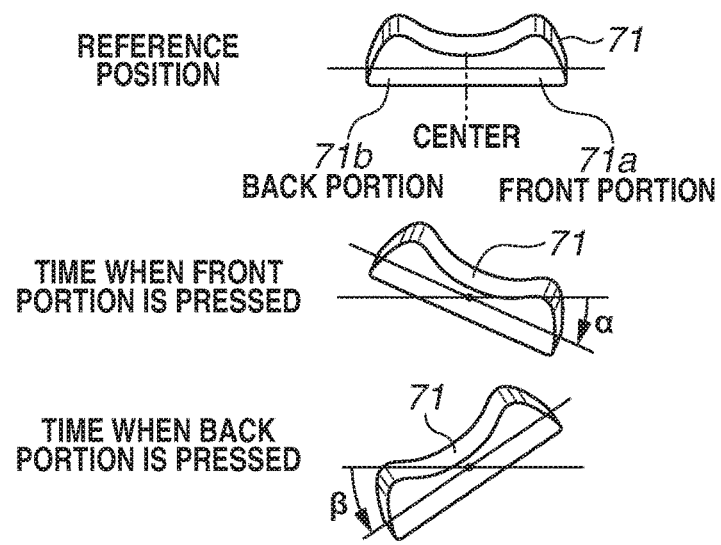

FIG. 2B is an external view illustrating how the zoom lever 71 turns. As illustrated in FIG. 2B, the zoom lever 71 is parallel to a supporting surface of the zoom lever 71 at a reference position. Here, when the front portion 71a is pressed, the front portion 71a gradually inclines toward the lens 103, and turns up to α degrees on the central position as illustrated in FIG. 2B. The user can change the zoom speed by adjusting the degree of the press of the front portion 71a. Similarly, when the back portion 71b is pressed, the back portion 71b turns up to β degrees (minus α degrees) on the central position as illustrated in FIG. 2B. The user presses the front portion 71a in a case where the user desires to zoom in, and the user presses the back portion 71b in a case where the user desires to zoom out. The user can thereby set a zoom direction and a zoom speed. In this way, the zoom lever 71 can turn (be operated) in a turning direction toward α degrees, and in a turning direction toward β degrees, which is the opposite direction.

Figure 2C:
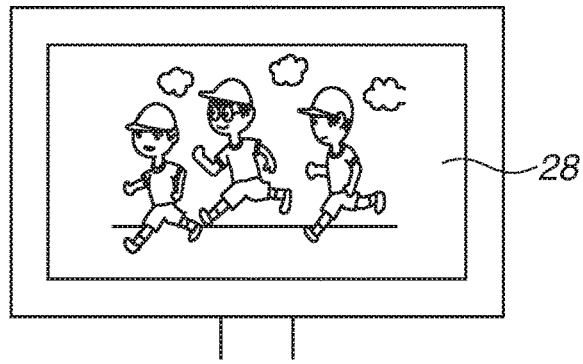

FIG. 2C illustrates a display example of the display unit 28. The display unit 28 has a display screen provided on the back (opposite to the lens 103). The user can operate, for example, the front portion 71a with the forefinger of the right hand and the back portion 71b with the ring finger of the right hand, while holding the digital camera 100 and viewing the display screen of the display unit 28.

Figure 3:
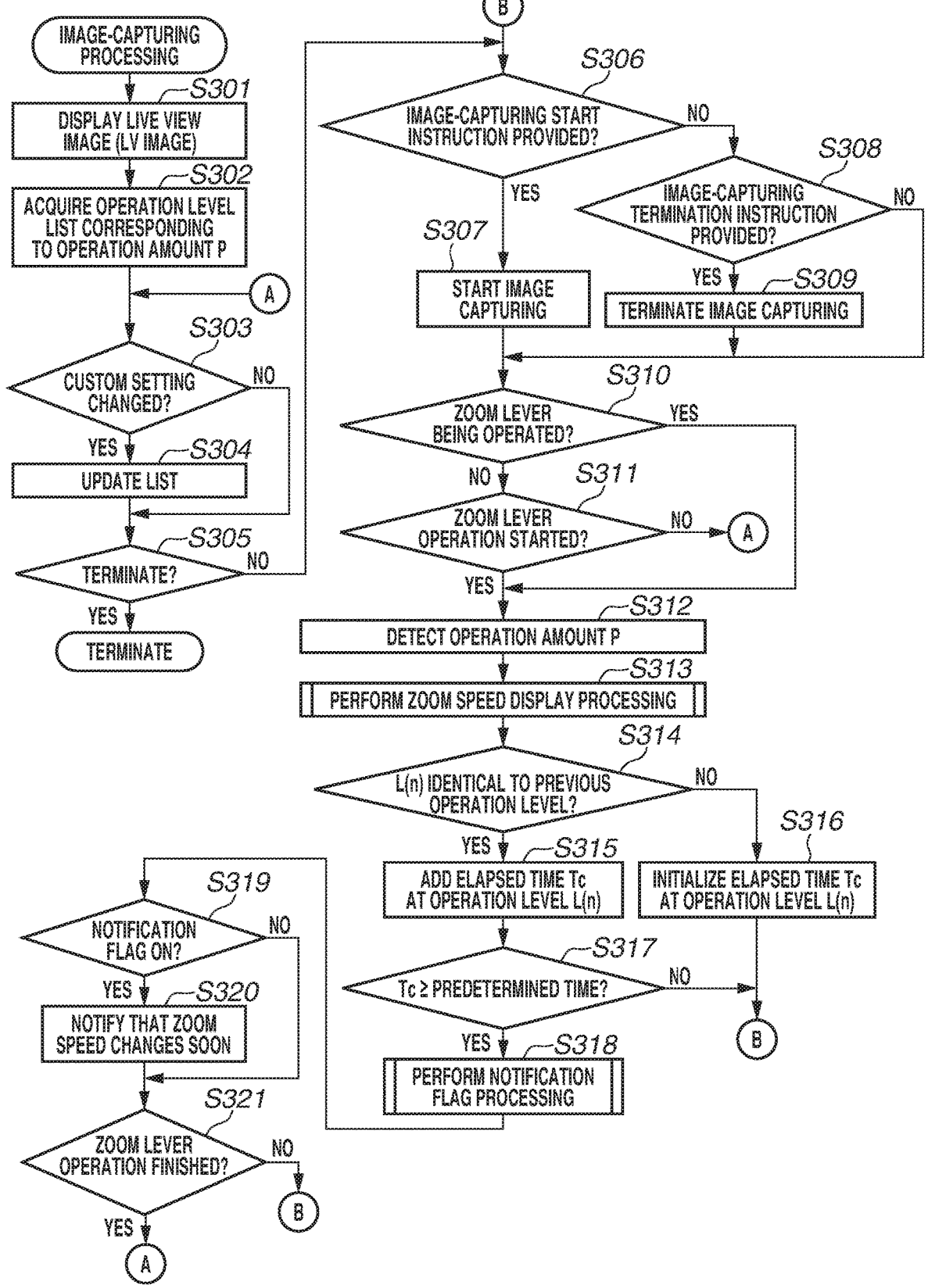
FIG. 3 is a flowchart illustrating image-capturing processing according to the present exemplary embodiment.

FIG. 3 is a flowchart illustrating image-capturing processing in the present exemplary embodiment. The system control unit 50 executes a program stored in a storage medium such as the nonvolatile memory 56, by loading the program into the system memory 52, thereby implementing each step in the flowchart in FIG. 3. The image-capturing processing illustrated in FIG. 3 begins when the digital camera 100 is powered on to enable image capturing.

In step S301, the system control unit 50 displays a live view image at the display unit 28.

In step S302, the system control unit 50 acquires an operation level list corresponding to an operation amount P. FIGS. 6A to 6C illustrate operation levels. FIG. 6A is a diagram illustrating the relationship between operation level and operation amount. As illustrated, the absolute value of an operation amount increases, as the operation amount transitions from zero degrees to α degrees (β degrees) in response to the press of the zoom lever 71. An operation in a direction from zero degrees toward the α degrees is in a plus direction, and an operation in a direction from zero degrees toward the β degrees is in a minus direction. In a case where an operation is performed toward α degrees, the zoom lever 71 inclines in a direction toward the lens 103.

In addition, FIG. 6A illustrates the absolute value of the operation amount. Here, the operation level represents each of five levels into which the amount of turning of the zoom lever 71 is divided. Among zero degrees to α degrees (β degrees), zero degrees to α/5 degrees are classified as an operation level L(1), and α/5 degrees to 2α/5 degrees are classified as an operation level L(2). Further, 2α/5 degrees to 3α/5 degrees are classified as an operation level L(3), 3α/5 degrees to 4α/5 degrees are classified as an operation level L(4), and 4α/5 degrees to the α degrees are classified as an operation level L(5). In a case where the back portion 71b is pressed, similarly, zero degrees to β/5 degrees are classified as an operation level L(1), β/5 degrees to 2β/5 degrees are classified as an operation level L(2), and so on.

FIGS. 6B and 6C each illustrates an example of a list of zoom speeds (the operation level list) set (custom-set) for each of the operation levels L illustrated in FIG. 6A. The user can set any of zoom speeds 0, 2, 4, 6, 8, 10, 12, 14, and 16, as the zoom speed for each of the operation levels L(1) to L(5). The zoom speeds are set in such a manner that the zoom speeds starting from the highest zoom speed acceptable by the digital camera 100 are divided into eight. The highest zoom speed is set as the zoom speed 16, and a zoom speed half the highest zoom speed is relatively set as the zoom speed 8. Similarly, for example, the zoom speeds 2, 4, and 6 described in the present exemplary embodiment each indicates a zoom speed relatively set based on the highest zoom speed. The zoom speed is higher as the number is larger. In the custom setting, the zoom speed can be set in such a manner that the zoom speed is higher as the absolute value of an operation amount of the zoom lever 71 is larger. A zoom speed desired by the user can also be set. In addition, the same zoom speed can be set for the operation levels next to each other, and the user can set the number of stages of change in the zoom speed. In the operation level list in FIG. 6B, the zoom speed changes in three stages. The operation level list in FIG. 6B indicates that the zoom speed 4 is set for the operation levels L(1) and L(2), the zoom speed 10 is set for the operation levels L(3) and L(4), and the zoom speed 16 is set for the operation level L(5). Five stages of zoom speed can also be set for the operation levels as illustrated in FIG. 6C. The operation level list is recorded in the system memory 52, and updated when each setting is changed. The operation level list is written from the nonvolatile memory 56 into the system memory 52 at power-on, and recorded from the system memory 52 into the nonvolatile memory 56 at power-off.

In step S303, the system control unit 50 determines whether the custom setting for the zoom speed is changed. Changing the custom setting for the zoom speed is an operation for changing the operation level list such as those illustrated in FIGS. 6B and 6C, and can be performed in the menu screen. If the system control unit 50 determines that the custom setting for the zoom speed is changed (YES in step S303), the processing proceeds to step S304. If not (NO in step S303), the processing proceeds to step S305.

In step S304, the system control unit 50 updates the operation level list, and records the updated operation level list into the system memory 52.

In step S305, the system control unit 50 determines whether to terminate the image-capturing processing. The termination of the image-capturing processing is executed by power-off of the digital camera 100, or transition to the playback mode. If the system control unit 50 determines to terminate the image-capturing processing (YES in step S305), the image-capturing processing ends. If not (NO in step S305), the processing proceeds to step S306.

In step S306, the system control unit 50 determines whether an image-capturing start instruction is provided. The image-capturing start instruction is provided by the press of the shutter button 61. In the moving image mode, an instruction for starting or terminating image capturing is provided. In a case where the image-capturing mode is the moving image mode and moving-image capturing is underway, the processing proceeds to step S308, without execution of the determination in step S306. In a case where moving-image capturing is not underway, the determination in step S306 is performed. In a case where the image-capturing mode is the still image mode, still-image capturing is performed by the press of the shutter button 61. If the system control unit 50 determines that an image-capturing start instruction is provided (YES in step S306), the processing proceeds to step S307. If not (NO in step S306), the processing proceeds to step S308.

In step S307, the system control unit 50 starts moving-image capturing to record a captured image acquired by the imaging unit 22 into the storage medium 200.

In step S308, the system control unit 50 determines whether an image-capturing termination instruction is provided. The image-capturing termination instruction is provided by the press of the shutter button 61 as with the start instruction. In a case where the image-capturing mode is the moving image mode and moving-image capturing is not underway, the processing proceeds to step S310 without execution of the determination in step S308. In a case where moving-image capturing is underway, the determination in step S308 is performed. If the system control unit 50 determines that an image-capturing termination instruction is provided (YES in step S308), the processing proceeds to step S309. If not (NO in step S308), the processing proceeds to step S310.

In step S309, the system control unit 50 terminates the moving-image capturing. The system control unit 50 then performs, for example, compression processing for the captured moving image and creation of a thumbnail, and records the moving image together with an image-capturing date and time.

In step S310, the system control unit 50 determines whether the zoom lever 71 is being operated. In other words, the system control unit 50 determines whether either the front portion 71a or the back portion 71b of the zoom lever 71 is pressed, or whether neither of these portions is pressed. If the system control unit 50 determines that the zoom lever 71 is being operated (YES in step S310), the processing proceeds to step S312. If not (NO in step S310), the processing proceeds to step S311.

In step S311, the system control unit 50 determines whether an operation on the zoom lever 71 has started. If the system control unit 50 determines that an operation on the zoom lever 71 has started (YES in step S311), the processing proceeds to step S312. If not (NO in step S311), the processing returns to step S303.

In step S312, the system control unit 50 detects an operation amount in the zoom lever 71 (the degree of press of the zoom lever 71). The operation amount of the zoom lever 71 detected here is the operation amount P. In a case where the front portion 71a is pressed, the system control unit 50 detects the operation amount P from the range of 0 to $\alpha$, whereas in a case where the back portion 71b is pressed, the system control unit 50 detects the operation amount P from the range of 0 to $\beta$ ($=-\alpha$). When the zoom lever 71 is operated, the zoom lever 71 turns about the center of the zoom lever 71 by the amount of the press.

In step S313, the system control unit 50 performs zoom speed display processing. The zoom speed display processing will be described below with reference to FIG. 4. In the zoom speed display processing, the operation level L corresponding to the operation amount P detected in step S312 is determined.

In step S314, the system control unit 50 determines whether the operation level L(n) determined in the zoom speed display processing is identical to the previously determined operation level. If the operation level L(n) is identical to the previously determined operation level (YES in step S314), the processing proceeds to step S315. If the operation level L(n) is different from the previously determined operation level (NO in step S314), the processing proceeds to step S316.

In step S315, the system control unit 50 adds an elapsed time Tc at the current operation level L, namely, a duration of the current operation level L. When a change occurs in the operation level L, the measurement of the elapsed time Tc starts and continues until the next change occurs in the operation level L.

In step S316, the system control unit 50 initializes the elapsed time Tc at the operation level L and starts measurement.

In step S317, the system control unit 50 determines whether the elapsed time Tc at the current operation level L is a predetermined time or more. If the system control unit 50 determines that the elapsed time Tc at the current operation level L is the predetermined time or more (the elapsed time Tc is included in the range of the current operation level for the predetermined time or more) (YES in step S317), the processing proceeds to step S318. If not, i.e., if the elapsed time Tc is less than the predetermined time (NO in step S317), the processing proceeds to step S306 without execution of notification flag processing.

In a case where the zoom lever 71 is operated at the same operation level L for a long time such as 10 seconds or 20 seconds at the current operation level L, it is highly likely that the user desires to maintain the current operation level L. In contrast, in a case where the current operation level L is held only for a short time such as 2 seconds or 3 seconds, it is highly likely that the user intends to pass the current operation level L and change the operation amount to the next (previous) operation level L. Therefore, in a case where the elapsed time at the current operation level L is equal to or more than the predetermined time such as 5, 7, or 10 seconds, the processing proceeds to the notification flag processing to be described below, so as to determine whether to provide a notification. The notification is provided to notify the user that the operation is about to extend beyond the current operation level, i.e., the zoom speed is about to change. Assume that the elapsed time at the current operation level L is shorter than the predetermined time. In this case, at this moment, it is still highly likely that the user intends to change the operation amount to the subsequent operation level. Therefore, the notification indicating that the zoom speed is about to change is not provided. The notification indicating that the zoom speed is about to change is rather highly likely to be unnecessary, because the user desires to pass the current operation level L and change to the zoom speed at the next operation level L.

If some information is always displayed immediately before a change in order to notify that the zoom speed is about to change, the displayed information for notification is always superimposed on a live view image. Therefore, visibility of the live view image may decrease due to such display unnecessary for the user. Sound may be generated to provide a notification. In this case as well, if the user has to check the content of the notification even when such a notification is unnecessary, it may be waste of time which reduces operationality. For example, in a case where the user desires to operate up to the operation level L(5), it is not necessary to provide a notification at the occurrence of every transition, such as a transition from the operation level L(1) to the operation level L (2), and a transition from the operation level L(2) to the operation level L(3). The user intentionally changes the zoom speed by operating the zoom lever 71 from one operation level to the subsequent operation level. Therefore, the user is aware that changes occur in the zoom speed during this operation and thus, the notification is likely to be unnecessary. Hence, the notification flag processing to be described below is performed in a case where it is highly likely that the user intends to maintain the current operation level (zoom speed). In other words, a notification indicating that the zoom speed is about to change can be provided only when this notification is necessary for the user, and thus operationality improves.

If where in the range of the operation level the current operation amount P is present is always displayed, there is a possibility that the user may be confused whether a zoom position is changing or whether the operation level is about to change. Therefore, the possibility of the confusion of the user about the display can be reduced by providing a notification when the user is highly likely to maintain the current operation level L (the zoom speed) (i.e., YES in step S317). In particular, during image capturing, the user is highly likely to be viewing a live view image or an object itself and therefore, operationality for the user is increased by providing only a necessary notification without providing an unnecessary notification.

In step S318, the system control unit 50 performs the notification flag processing. The notification flag processing is performed to determine whether to notify the user beforehand that the current zoom speed is about to change, or the current zoom speed is about to greatly change, by attaching a flag. The flag to be attached indicates whether to notify beforehand that the zoom speed (a zoom processing amount) is about to change due to a change from the current operation level L to the next (previous) operation level L, or whether the operation level L (the zoom speed) is to greatly change soon. The notification flag processing will be described in detail with reference to FIG. 5.

In step S319, the system control unit 50 determines whether the notification flag is ON. The notification flag is determined to be ON or OFF in step S318 described above. If the system control unit 50 determines that the notification flag is ON (YES in step S319), the processing proceeds to step S320. If not (NO in step S319), the processing proceeds to step S321.

Figure 7A:
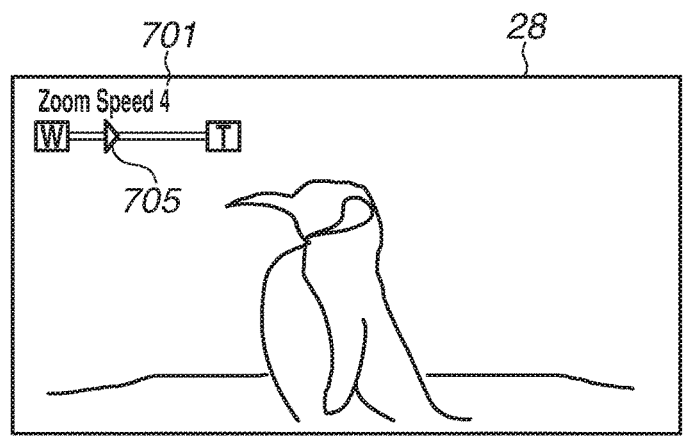
FIGS. 7A to 7D each illustrate a display example according to the present exemplary embodiment.
Figure 7B:
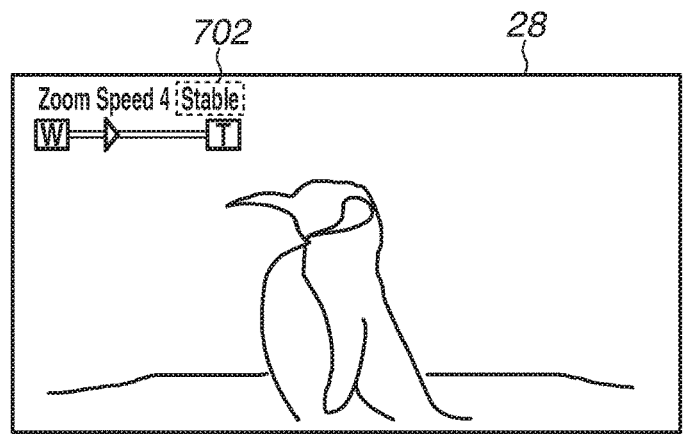
Figure 7C:
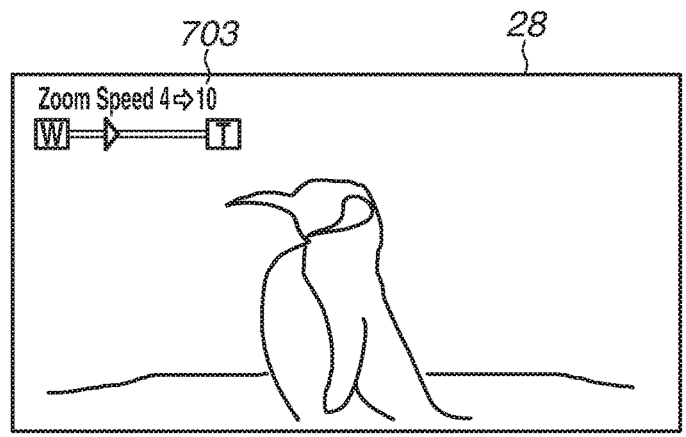
Figure 7D:
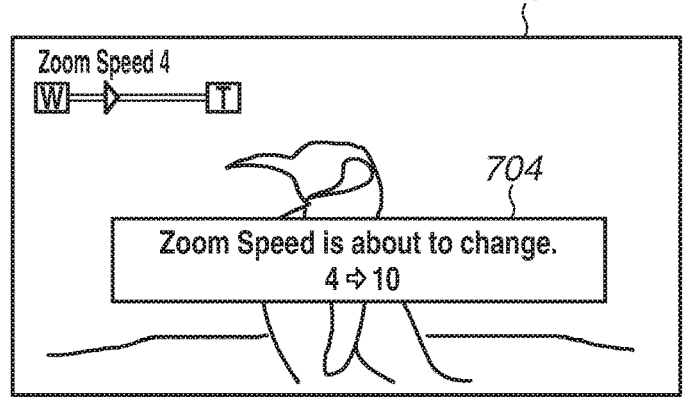

In step S320, the system control unit 50 notifies that the zoom speed is to change soon. FIGS. 7A to 7D each illustrate a display example in the display unit 28. FIGS. 7C and 7D illustrate an example of the notification in step S320. FIGS. 7C and 7D illustrate a display example in a case where the notification is provided when the zoom speed changes from 4 to 10. An icon 703 illustrated in FIG. 7C indicates that the zoom speed changes from 4 to 10. Further, a guide 704 illustrated in FIG. 7D indicates that the zoom speed is about to change. Other way of providing the notification such as sound or a vibration function (shake) may be adopted. As for the content of the notification, there may be adopted a notification indicating the width of the acquired operation level L(2), or the position (an absolute position or a relative position) of the acquired operation amount P with respect to the border between the operation levels L(2) and L(3).

In step S321, the system control unit 50 determines whether the zoom lever operation is finished. If the system control unit 50 determines that the zoom lever operation is finished (YES in step S321), the processing proceeds to step S303. If not (NO in step S321), the processing proceeds to step S306.

Figure 4:
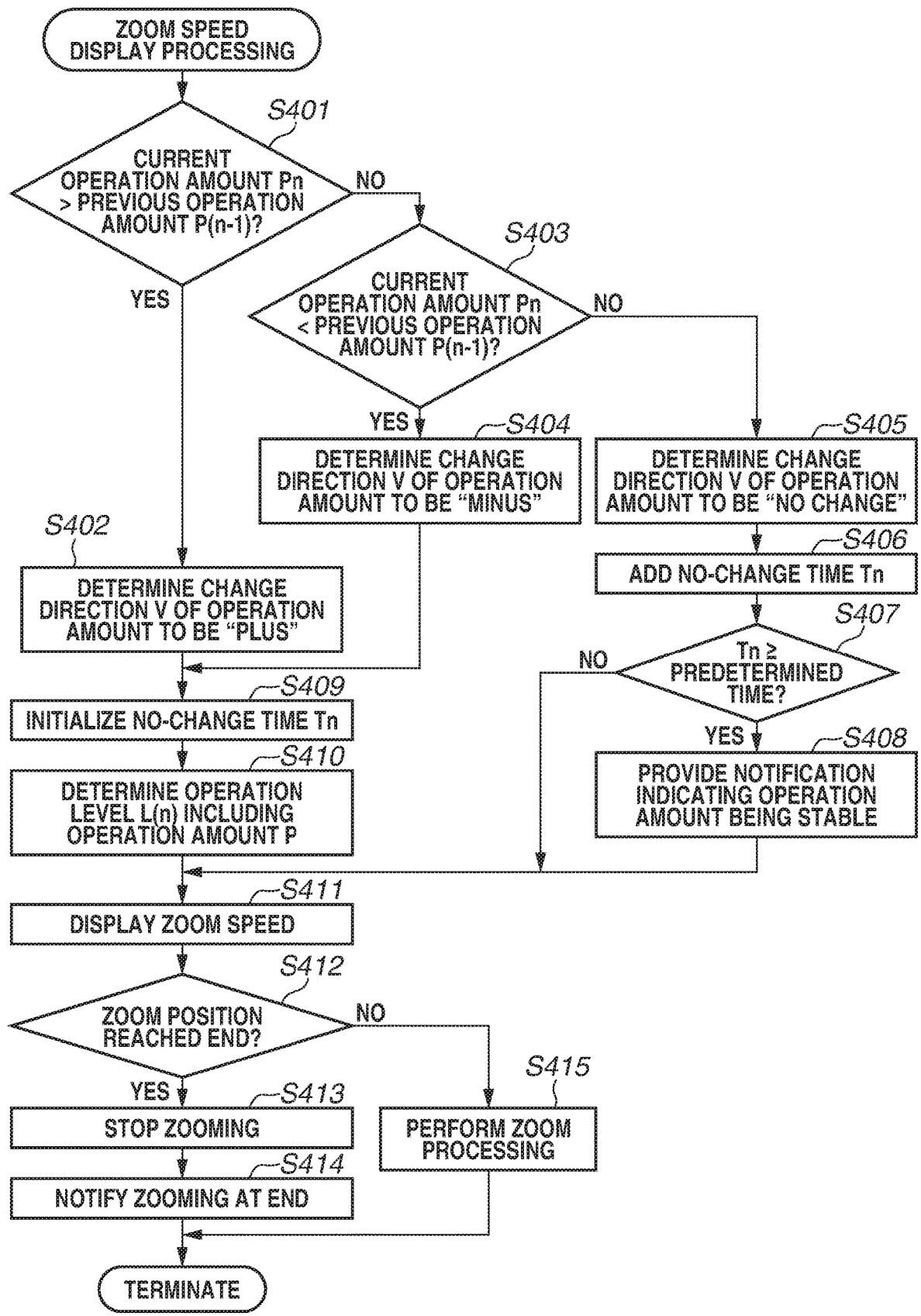
FIG. 4 is a flowchart illustrating zoom speed display processing according to the present exemplary embodiment.

Next, the zoom speed display processing will be described with reference to FIG. 4. The zoom speed display processing illustrated in FIG. 4 is detailed processing performed in step S313 illustrated in FIG. 3, and begins when the processing proceeds to step S313 in FIG. 3.

In step S401, the system control unit 50 determines whether the operation amount Pn of the zoom lever 71 detected in step S312 is larger than the operation amount P(n−1) of the zoom lever 71 previously detected in step S312. The operation amount Pn represents the current operation amount, and the operation amount P(n−1) represents the operation amount detected when step S312 was previously performed. If the operation amount Pn of the zoom lever 71 is larger than the operation amount P(n−1) of the zoom lever 71 detected immediately before (YES in step S401), the processing proceeds to step S402. If the operation amount Pn of the zoom lever 71 is equal to or less than the operation amount P(n−1) of the zoom lever 71 detected immediately before (NO in step S401), the processing proceeds to step S403. In step S401, the determination result is YES in a case where an operation is performed in a direction for pressing the front portion 71a of the zoom lever 71, or in a case where an operation is performed in a direction for reducing the press of the back portion 71b. In other words, the determination result is YES in a case where the zoom lever 71 inclines toward the lens 103. In a case where the determination in step S401 is performed for the first time after YES is decided as the result of the determination in step S311, the system control unit 50 determines whether the zoom lever 71 is operated in the plus direction with respect to an operation amount 0.

In step S402, the system control unit 50 determines a change direction V of the operation amount P to be plus, and records this result into the system memory 52.

In step S403, in contrast to step S401, the system control unit 50 determines whether the operation amount Pn of the zoom lever 71 detected in step S312 is smaller than the operation amount P(n−1) of the zoom lever 71 previously detected in step S312. If the system control unit 50 determines that the current operation amount Pn is smaller than the previous operation amount P(n−1) (YES in step S403), the processing proceeds to step S404. If not (NO in step S403), the processing proceeds to step S405.

In step S404, the system control unit 50 determines the change direction V of the operation amount P to be minus and records this result into the system memory 52.

In step S405, the system control unit 50 determines the change direction V of the operation amount to be no change, and records this result into the system memory 52.

In step S406, the system control unit 50 adds a no-change time Tn, and records this result into the system memory 52. The no-change time Tn represents an elapsed time of a state where the current operation amount P is maintained (or the width is the same as α/5 or within a specific range narrower than α/5).

In step S407, the system control unit 50 determines whether the no-change time Tn is a predetermined time or more. The predetermined time is a time period such as five seconds or seven seconds. If the system control unit 50 determines that the no-change time Tn is the predetermined time or more (YES in step S407), the processing proceeds to step S408. If not (NO in step S407), the processing proceeds to step S411.

In step S408, the system control unit 50 provides a notification indicating that the operation amount is stable. This is because the system control unit 50 has determined that the operation of the same operation amount is continued for the predetermined time or longer (there is no change for the predetermined time) in step S407. The notification indicating that the operation amount is stable stops in response to the occurrence of a change in the operation amount. FIG. 7B illustrates an item 702 indicating that the operation amount is stable. In this way, displaying the operation amount being stable allows the user to understand that zooming is to be performed at the same zoom speed as the current zoom speed if the user continues the same operational feeling.

In step S409, the system control unit 50 initializes the no-change time Tn, and records the result into the system memory 52.

In step S410, the system control unit 50 determines the operation level L including the operation amount P. As described with reference to FIG. 6A, which one of the five operation levels includes the operation level is determined. The zoom direction of the plus direction and the zoom direction of the minus direction are different even if the operation amounts are the same.

In step S411, the system control unit 50 displays the zoom speed corresponding to the operation level L determined in step S410, at the display unit 28. In a case where the current operation level list is the operation level list illustrated in FIG. 6B and the operation level is determined to be L(1) in step S410, the zoom speed is 4 and thus, the zoom speed 4 is displayed. In a case where the operation level L(4) is determined, the zoom speed is 10 and thus, the zoom speed 10 is displayed. An item 701 in FIG. 7A is a display example of the zoom speed in a case where the zoom speed is 4 in the plus direction (a zoom-in direction). An item 705 is an arrow indicating the direction of zooming. In a case where the arrow is directed toward a T (tele-photo) side, the item 705 indicates that zooming is performed at the zoom speed 4 in the zoom-in direction. In a case where the arrow is directed toward a W (wide-angle) side, the item 705 indicates that zooming is performed at the zoom speed 4 in a zoom-out direction.

In step S412, the system control unit 50 determines whether the zoom position has reached an end. In a case where the zoom position has reached a tele-photo end, i.e., the item 705 (arrow) has moved to a position indicated with T, zooming in the zoom-in direction cannot be performed any further. Alternatively, in a case where the zoom position has reached a wide-angle end, i.e., the item 705 (arrow) has moved to a position indicated with W, zooming in the zoom-out direction cannot be performed any further. If the system control unit 50 determines that the zoom position has reached the end (YES in step S412), the processing proceeds to step S413. If not (NO in step S412), the processing proceeds to step S415.

In step S413, the system control unit 50 stops the zooming, because the system control unit 50 has determined that zooming cannot be performed any further in step S412.

In step S414, the system control unit 50 notifies that the zooming is at the end. For the notification indicating that the zooming is at the end, for example, a display mode may be changed by coloring the arrow, or a guide may be displayed.

In step S415, the system control unit 50 performs zoom processing. The zoom processing is performed at the zoom speed corresponding to the operation level L determined in step S410.

Figure 5:
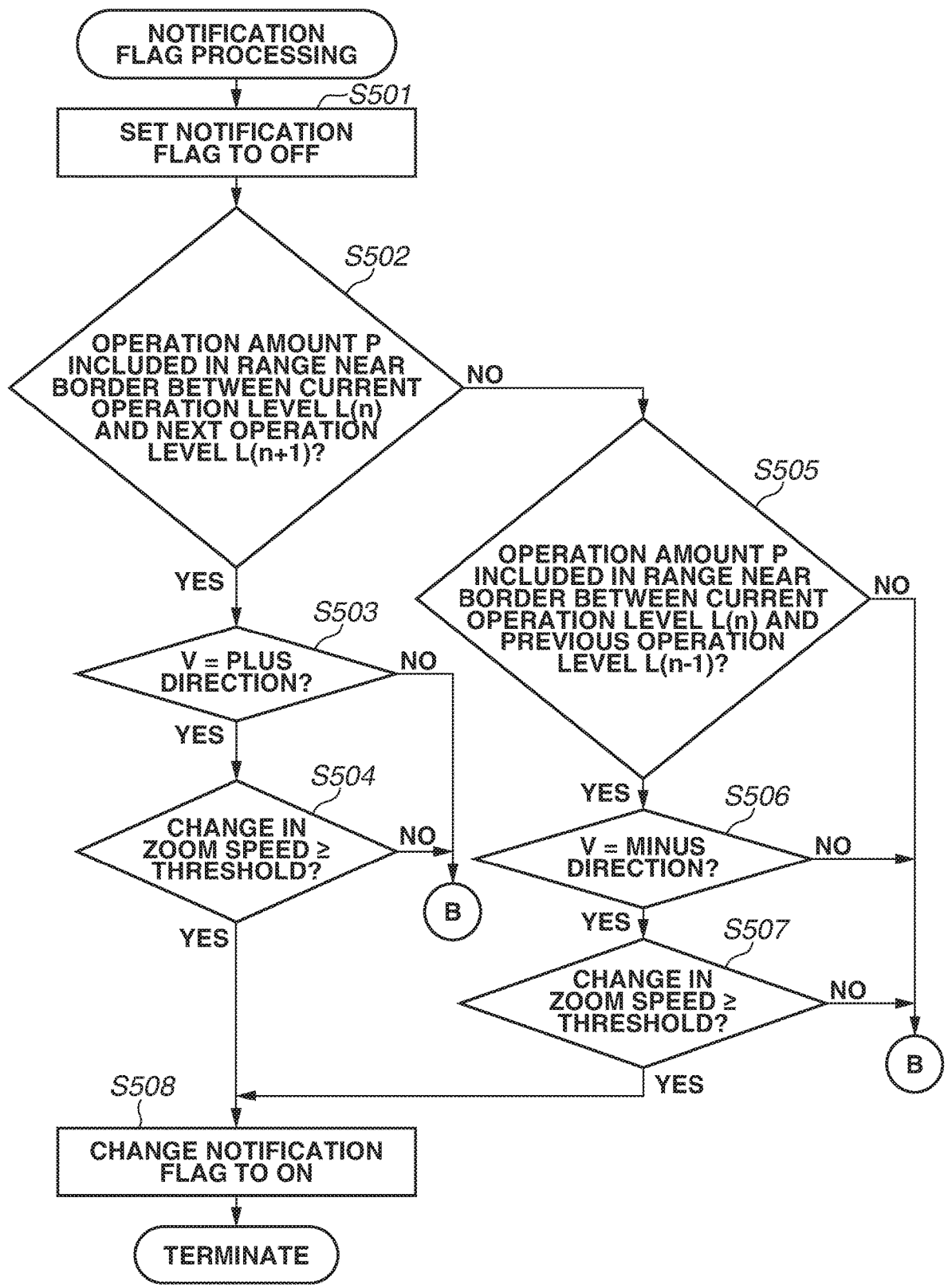
FIG. 5 is a flowchart illustrating notification flag processing according to the present exemplary embodiment.

Next, the notification flag processing will be described with reference to FIG. 5. The notification flag processing illustrated in FIG. 5 is detailed processing performed in step S318 illustrated in FIG. 3, and begins when the processing proceeds to step S318 in FIG. 3.

In step S501, the system control unit 50 sets the notification flag to OFF, and records this result into the system memory 52.

In step S502, the system control unit 50 determines whether the operation amount Pn is included in a range near the border between the current operation level L(n) and the next operation level L(n+1). The border between each operation level and an operation level before/after the operation level will be described with reference to FIG. 6A. In FIG. 6A, for example, a near-border range in the operation level L(2) with the operation level L(3) is a range at an end of the operation level L(2), and is $(2α/5)−γ ≤ (border) < 2α/5$ on the operation level L(3) side. Similarly, a range γ at an end of the range of each operation level is the border. Here, γ is a size equal to one-fifth or one-seventh of an operation level α/5 for one stage. However, in a case where the current operation level is the operation level L(5), there is no next operation level and thus, the result of the determination in step S502 is NO. If the system control unit 50 determines that the current operation amount is included in the range near the border with the next operation level (YES in step S502), the processing proceeds to step S503. If not (NO in step S502), the processing proceeds to step S505.

In step S503, the system control unit 50 determines whether the change direction V of the operation amount determined in step S402 or S404 is the plus direction. If the system control unit 50 determines that the change direction V of the operation amount is the plus direction (YES in step S503), the processing proceeds to step S504. If not (NO in step S503), the processing proceeds to step S306 in FIG. 3.

In step S504, the system control unit 50 determines whether a change from the current zoom speed to the zoom speed set for the next operation level is equal to or more than a threshold (a predetermined amount or more). If the system control unit 50 determines that the change from the current zoom speed to the zoom speed set for the next operation level is equal to or more than the threshold such as 4 or 6 (YES in step S504), the processing proceeds to step S508. If not (NO in step S504), the processing proceeds to step S306 in FIG. 3. For example, in a case where the zoom speed changes from 4 to 10, the zoom speed jumps by 3/8 of the magnitude of an executable zoom speed, which is 16, and thus the amount of the change in the zoom speed due to a change in the operation level is large. When being notified that the zoom speed is to change, the user can recognize that the zoom speed can greatly change if the user presses the zoom lever 71 a little further. In a case where a change such as a change from 2 to 4 occurs in the zoom speed, this change is not large, so that even when an unintentional change occurs in the zoom speed, the amount of this change is also small. If display or sound for a notification is always provided regardless of whether the amount of a change in the zoom speed is large or small, operationality is likely to decline. Therefore, when a change in the zoom speed is small, a notification is not provided because an influence on a captured moving image is small. In contrast, when a change in the zoom speed is large, an influence on a captured moving image is large and thus, it is appropriate to provide a notification beforehand to prevent the user from unintentionally changing the zoom speed. The determination in step S504 may be performed based on the number of stages, instead of being performed based on the magnitude of a change in the zoom speed. In the operation level list illustrated in FIG. 6B, the zoom speed changes in three stages of 4, 10, and 16. In the operation level list illustrated in FIG. 6C, the zoom speed changes in five stages of 2, 4, 6, 8, and 12. In the case where the zoom speed changes in three stages, a change by one stage is a large change among the set zoom speeds. In contrast, in the case where the zoom speed changes in five stages, a change by one stage is not as large as that of the three stages and therefore, it is not necessary to provide a notification. In other words, in a case where the zoom speed changes to the next operation level, if the number of stages of the set zoom speed is equal or less than a predetermined number such as three steps or two steps, the processing proceeds to step S508. If not (if the number of stages is more than the predetermined number), the processing proceeds to step S306. Further, in a case where the number of stages of the set zoom speed is less than the predetermined number, and further, the amount of a change in the zoom speed to the next operation level is equal to or more than a threshold, the result of the determination in step S504 may be YES.

In step S502 to step S504, it is determined whether the current operation level is approaching the border with the next operation level, and further, whether the zoom speed is about to greatly change. In step S505 to step S507, it is determined whether the current operation level is approaching the border with the previous operation level, and further, whether the zoom speed is about to greatly change. However, in a case where the current operation level is the operation level L(1) in step S505, there is no previous operation level L. Therefore, the result of the determination in step S505 is No.

In step S508, the system control unit 50 changes the notification flag to ON, and records this result into the system memory 52. The notification displayed on the display unit 28 is hidden if the notification flag is not changed to ON in the notification flag processing in FIG. 5.

As described above, according to the exemplary embodiment, it is possible to improve the operationality for the user when processing according to an operation amount is performed. In a case where the zoom speed is changed according to an operation on the zoom lever 71, it is possible to recognize that the zoom speed is to change, before the occurrence of a change in the zoom speed due to a change in the operation level L. Further, in a case where an elapsed time at the current operation level is short, a notification is not provided even if the zoom speed is about to change. In other words, in a case where the user is about to pass the current operation level and change to the next (previous) operation level, it is unlikely that the user intends to maintain the current operation level (zoom speed). Therefore, in this case, a notification is not provided. This can reduce such a possibility of visibility being deteriorated due to unnecessary display for the user or a possibility of a notification being provided even if an operation is performed intentionally.

In the above-described exemplary embodiment, the magnitude of a zoom speed (a processing amount) is determined according to an operation amount of the zoom lever 71, and zooming is performed at the determined zoom speed. However, the magnitude of a zoom speed to be executed may be determined according to an operation amount of the zoom lever 71, and zooming may be performed by other operation unit.

A notification indicating that the zoom speed is to change may be provided in a case where the notification flag is ON and recording of a moving image is underway, whereas such a notification may not be provided in a case where recording of a moving image is not underway.

The notification in the above-described exemplary embodiment is an example. A message saying only "zoom speed change" may be displayed or the arrow illustrated in FIG. 7 may be enlarged.

In a lens with a narrow zoom range, zooming operation itself is completed in a short time. Therefore, a zoom position is likely to arrive at a zoom end before a zoom speed change is notified. Hence, a notification may be provided in a case where the zoom range of a connected lens is a predetermined range or more such as 100 mm or 150 mm.

In a case where an operation amount increases or decreases at a constant rate and straddles the border between a plurality of operation levels, the user is highly likely to understand at what rate the zoom speed changes. Therefore, in a case where the operation amount changes at a constant rate, a notification may be provided for the first and second times, but may not be provided for the third and subsequent times.

In the above-described exemplary embodiment, the displayed notification is hidden in a case where the operation amount is changed in a direction away from the near-border range of the operation level, and in a case where the zoom speed changes past the border. In other words, the displayed notification is hidden in a case where the change direction of the operation amount is changed or the change in the operation amount is no longer present (the notification flag being OFF), after the notification is provided once. The notification may not be displayed even if the notification flag subsequently changes to ON again in the same near-border range, because the user has already received the notification once. In other words, the notification is not provided in the following case. First, an operation at the operation level L(1) approaches the border with the operation level L(2), and then a notification is displayed. Subsequently, the change in the operation amount is no longer present in the near-border range (the notification being hidden) and then, the operation amount changes again in a direction toward the operation level L(2).

Further, in the above-described exemplary embodiment, the conditions for changing the notification flag to ON in FIG. 5 are described to be a case where the current operation amount is included in the near-border range, a case where the operation is performed in the direction for extending beyond the operation level, and the amount of the change in the zoom speed is equal to or more than the threshold. The notification is provided when all these conditions are satisfied. However, not all these three conditions may be satisfied to change the notification flag to ON. For example, the notification flag may be changed to ON, if the operation amount P is included in the near-border range. Alternatively, the notification flag may be changed to ON, if the operation amount P is included in the near-border range and the operation is performed in the direction for extending beyond the operation level. Further, in a case where the amount of a change between the current operation level and the next operation level is large, the notification flag may be changed to ON regardless of the operation amount.

In the above-described exemplary embodiment, the operations are classified into the five operation levels (ten operation levels when those for the plus direction and those for the minus direction are combined). However, the operation levels are not limited to five, and may be three or eight. Further, as for the zoom speed settable at each of the operation levels, the same zoom speed may be set for the adjacent operation levels as in the above-described exemplary embodiment, or the zoom speed different for each of the operation levels may set.

Further, changing the magnitude of the zoom speed for each of the operation levels is described, but the function to be executed according to an operation on the zoom lever 71 is not limited to the zoom processing, and may be assigned to other items of setting change. Examples of the other items of setting change include sound volume, display-screen luminance (brightness), magnifying factor, moving speed in game, International Organization for Standardization (ISO) sensitivity, shutter speed, and aperture numerical value. Examples of the other items of setting change further include forwarding speed for image feeding and moving-image playback. For example, the sound volume may be set to be small in a case where the operation on the zoom lever 71 is at the operation level L(1), and to be middle in a case where the operation is at the operation level L(2). In another example, the forwarding speed (jump unit) for still image may be set as follows. Feeding is performed every three images in a case where the operation on the zoom lever 71 is at the operation level L(2), every ten images in a case where the operation is at the operation level L(3), and for each date in a case where the operation is at the operation level L(4). Further, in the moving-image playback, the playback speed may be set according to the operation level L. In this way, the present exemplary embodiment is also applicable to items other than the zoom speed. When the present exemplary embodiment is applied to the moving-image playback, the user can avoid an unintentional change in the playback speed.

Furthermore, in the case of the zoom speed, the notification may be provided only in a case where a change occurs in a direction for increasing the zoom speed. In the case of the image feeding, the notification may be provided only in a case where a change occurs in a direction for increasing the jump unit. In the case of the moving-image playback, the notification may be provided only in a case where a change occurs in a direction for increasing the playback speed. In the case of the sound volume, the notification may be provided only in a case where a change occurs in a direction for increasing the sound volume.

As the operation on the operation member, pressing the zoom lever 71 is described in the above-described exemplary embodiment. However, the operation on the operation member may be an operation on other operation member. For example, the operation amount may be detected based on a dial rotation, the degree of press on a touch panel, and the degree of inclination of the apparatus itself or the operation member.

Further, in the above-described exemplary embodiment, to zoom in is described to be performed in a case where the zoom lever 71 is operated in the plus direction, and to zoom out is described to be performed in a case where the zoom lever 71 is operated in the minus direction. However, the plus direction and the minus direction may be unnecessary depending on the function to be assigned. For example, there is no minus in the case of the sound volume and therefore, the operable (pressing) direction of the zoom lever 71 may be only one direction. Alternatively, the operable direction may be set such that the sound volume is increased in both of the plus direction and the minus direction.

One piece of hardware may perform the various kinds of control described to be performed by the system control unit 50. Alternatively, pieces of hardware may share the processing, thereby controlling the entire apparatus.

The present disclosure is described based on suitable exemplary embodiments, but is not limited to these specific exemplary embodiments. The present disclosure also includes various forms within the scope not deviating from the gist of the present disclosure. Further, the above-described exemplary embodiments each represent only one exemplary embodiment of the present disclosure, and can be combined as appropriate.

Furthermore, in the above-described exemplary embodiments, the case where the present disclosure is applied to the digital camera 100 is described as an example. However, the present disclosure is not limited to this example, and is applicable to any type of electronic apparatus as long as the electronic apparatus can execute processing according to an operation amount. In other words, the present disclosure is applicable to, for example, a smartphone, a mobile phone terminal, a portable image viewer, a printer apparatus with a viewfinder, a digital photo frame, a music player, a game console, and an electronic book reader.

According to an exemplary embodiment of the present disclosure, it is possible to improve operationality for a user when processing according to an operation amount is performed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-178962, filed Sep. 19, 2017, which is hereby incorporated by reference herein in its entirety.

What is claimed is:

1. An electronic apparatus comprising:
a memory and at least one processor and/or circuit which function as:
an acquisition unit configured to acquire an operation amount of an operation member,
a processing unit configured to execute processing using a first processing amount for a predetermined item, in a case where the operation amount acquired by the acquisition unit is included in a range of a first operation amount of the operation member, and to execute processing using a second processing amount for the predetermined item, in a case where the operation amount acquired by the acquisition unit is included in a range of a second operation amount next to the range of the first operation amount, and
a control unit configured to perform control for providing a notification about a processing amount for the predetermined item being close to changing from the first processing amount which is currently in use, in a case where a predetermined condition, that the operation amount acquired by the acquisition unit is continuously included in the range of the first operation amount for a predetermined elapsed time or greater, is satisfied,
wherein the predetermined item is a zoom speed, and a speed of zooming to be executed in a case of the range of the first operation amount is higher than a speed of zooming to be executed in a case of the second operation amount, and
wherein the control unit provides the notification in a case where the predetermined condition is satisfied and recording of a moving image is underway, and the control unit avoids providing the notification in a case where recording of a moving image is not underway, even in a case where the predetermined condition is satisfied.

2. The electronic apparatus according to claim 1, wherein the control unit does not provide the notification, in a case where the operation amount acquired by the acquisition unit is not continuously included in the range of the first operation amount for the predetermined time or more.

3. The electronic apparatus according to claim 1, wherein the predetermined condition is that the operation amount acquired by the acquisition unit is continuously included in the range of the first operation amount for a predetermined elapsed time or greater, and further, the operation amount acquired by the acquisition unit is included in a near range, the near range being a range at an end of the range of the first operation amount and being close to the range of the second operation amount.

4. The electronic apparatus according to claim 3, wherein the notification indicates that a processing amount of processing for the predetermined item to be performed by the processing unit changes from the first processing amount to the second processing amount.

5. The electronic apparatus according to claim 3, wherein the predetermined condition is that the operation amount acquired by the acquisition unit is continuously included in the range of the first operation amount for a predetermined elapsed time or greater, and further, a difference between the second processing amount and the first processing amount is a predetermined amount or more.

6. The electronic apparatus according to claim 5, wherein the control unit performs control for stopping the notification, in response to a change in the operation amount acquired by the acquisition unit, in a direction away from the second operation amount.

7. The electronic apparatus according to claim 3, wherein, in a case where the notification is provided when the operation amount acquired by the acquisition unit is included in the near range, and then the operation amount acquired by the acquisition unit is no longer included in the near range and the notification is thereby stopped, the control unit performs control for not providing the notification even when the operation amount acquired by the acquisition unit is subsequently included in the near range again.

8. The electronic apparatus according to claim 1, wherein the predetermined condition is a case where the operation amount acquired by the acquisition unit is continuously included in the range of the first operation amount for a predetermined elapsed time or greater, and further, a change direction of the operation amount acquired by the acquisition unit approaches the range of the second operation amount from the range of the first operation amount.

9. The electronic apparatus according to claim 8, wherein in a case where the notification is provided when the change direction of the operation amount acquired by the acquisition unit is a first direction approaching the range of the second operation amount from the range of the first operation amount, and then the change direction of the operation amount acquired by the acquisition unit changes to a direction opposite to the first direction and thereby the notification is stopped, the control unit performs control for not providing the notification even in a case where the change direction is further changed to the first direction.

10. The electronic apparatus according to claim 1, wherein the memory and at least one processor and/or circuit further function as a setting unit configured to set a processing amount of processing to be executed for the predetermined item, for a range of each of a plurality of operation amounts including the range of the first operation amount and the range of the second operation amount, wherein the predetermined condition includes a case where a number of types of processing amount set in the ranges of the plurality of operation amounts is less than a predetermined number.

11. The electronic apparatus according to claim 1, wherein the control unit performs control for stopping the notification, in response to a change in the operation amount acquired by the acquisition unit from the range of the first operation amount to the range of the second operation amount.

12. The electronic apparatus according to claim 1, wherein the predetermined item includes at least one of sound volume, display-screen luminance, magnifying factor, moving speed in game, International Organization for Standardization (ISO) sensitivity, shutter speed, and aperture numerical value.

13. The electronic apparatus according to claim 1, wherein the operation member is a member capable of being pressed, and the operation amount is a degree of press of the operation member.

14. The electronic apparatus according to claim 1, wherein the operation member is capable of being operated in a first turning direction, and a second turning direction opposite to the first turning direction, from a reference position.

15. The electronic apparatus according to claim 1, wherein the operation amount of the operation member includes at least one of a rotation amount of a dial, a degree of press of a touch panel, and a degree of inclination of an operation member.

16. The electronic apparatus according to claim 1, wherein in a case where the operation amount acquired by the acquisition unit satisfies the predetermined condition, and the operation amount remains within the range of the first operation amount over a specific time period, the control unit performs control for providing a notification indicating that the operation amount is stable.

17. The electronic apparatus according to claim 1, further comprising an image sensor configured to perform imaging.

18. A control method for an electronic apparatus, the method comprising:

acquiring an operation amount of an operation member;

executing processing using a first processing amount for a predetermined item, in a case where the acquired operation amount is included in a range of a first operation amount of the operation member, and executing processing using a second processing amount for the predetermined item, in a case where the acquired operation amount is included in a range of a second operation amount next to the range of the first operation amount; and performing control for providing a notification about a processing amount for the predetermined item being close to changing from the first processing amount which is currently in use, in a case where a predetermined condition, that the acquired operation amount is continuously included in the range of the first operation amount for a predetermined elapsed time or greater, is satisfied, wherein the predetermined item is a zoom speed, and a speed of zooming to be executed in a case of the range of the first operation amount is higher than a speed of zooming to be executed in a case of the second operation amount, and wherein the notification is provided in a case where the predetermined condition is satisfied and recording of a moving image is underway, and the notification is not provided in a case where recording of a moving image is not underway, even in a case where the predetermined condition is satisfied.

19. A computer readable non-transitory storage medium storing a program for causing a computer to function as each of the units of the electronic apparatus according to claim 1.

* * * * *